United States Patent [19]

Nakanishi et al.

[11] Patent Number: 4,609,918
[45] Date of Patent: Sep. 2, 1986

[54] GRAPH-DRAWING MACHINE

[75] Inventors: Yasuhiro Nakanishi, Nara; Koichi Hatta, Yamatokoriyama, both of Japan

[73] Assignee: Sharp Kabushiki Kaisha, Osaka, Japan

[21] Appl. No.: 528,845

[22] Filed: Sep. 2, 1983

[30] Foreign Application Priority Data

Sep. 10, 1982 [JP] Japan .................................. 57-158392

[51] Int. Cl.⁴ .............................................. G09G 3/00
[52] U.S. Cl. .................................... 340/753; 340/754; 340/722; 364/518
[58] Field of Search ............... 340/721, 722, 753, 754, 340/715; 364/519, 518, 520, 709, 710, 715

[56] References Cited

U.S. PATENT DOCUMENTS 4,375,079 2/1983 Ricketts et al. ..................... 340/721
4,442,424 4/1984 Shirasaki et al. ................... 340/715

FOREIGN PATENT DOCUMENTS 3003774 8/1981 Fed. Rep. of Germany ...... 340/722

Primary Examiner—Gerald L. Brigance
Attorney, Agent, or Firm—Birch, Stewart, Kolasch & Birch

[57] ABSTRACT

A graph drawing machine adapted to print numeric data in graph form when the numeric data are inputted and a graph-printing instruction is given. Through a selection operation by the graph type selection switches, a given graph type is selected, and simultaneously one graph format or two or more formats, predetermined as suitable for the graph type selected, are adapted to be automatically set.

8 Claims, 8 Drawing Figures

GRAPH-DRAWING MACHINE

BACKGROUND OF THE INVENTION

The present invention relates to a graph drawing machine of electronic type, which prints out numeric data in graph form when the numeric data are inputted and a given graph-printing instruction is given.

SUMMARY OF THE INVENTION

In general, it is desired in practical use to provide a graph-drawing machine, wherein an operator can choose a graph type by use of selection switches. Simultaneously one graph format, or two or more predetermined formats that are suitable for the graph type selected, are automatically set. In addition, it is preferable to provide a graph-drawing machine such that a signal, identifying the graph format chosen is displayed. Also, when the operator wants to change the graph format a new format can be selected by the actuation of a graph format key display.

An object of the present invention is to provide a graph-drawing machine which is capable of easily and quickly setting various graph formats.

According to the present invention, there is provided a graph-drawing machine which is print out numeric data in graph form when the numeric data are inputted and a given graph-printing instruction is given, characterized in that a given graph type is selected and simultaneously a graph format suitable for said selected graph type is set in accordance with a selecting operation by a graph type selecting switch, the respective graph formats can be set or released by the selection of graph format keys, which are provided in addition to the above-described graph type selecting switches, and the graph format is to be displayed.

This object and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
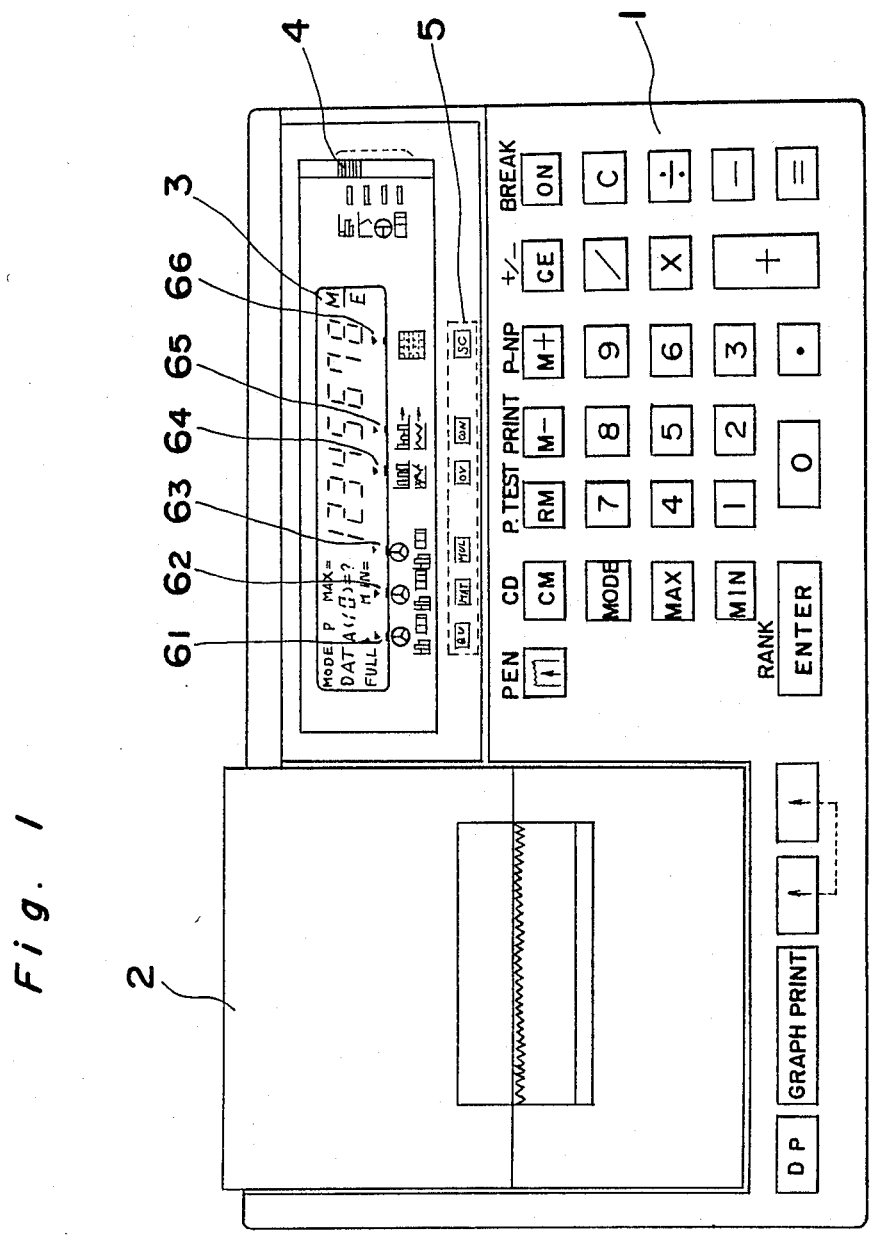
FIG. 1 is a plan view showing the appearance of a graph-drawing machine in one embodiment of the present invention.

Referring to FIG. 1, there is provided a graph-drawing machine, in one embodiment of the present invention, comprising a key input unit 1 for inputting numeric data or instructing graph prints, a printer unit 2 for printing the graphs, a display unit 3 for displaying the inputted numeric data, and a slide switch 4 for selecting a graph type. With the above machine, through the actuation of the slide switch 4, one of four types of graph can be selected; rod graph; line graph; circular graph; and band graph. In addition, a graph format (hereinafter referred to as "format") suitable for a graph type selectively specified can be automatically set by the slide switch action.

The formats in the present embodiment are provided as follows.

(1) Quick Format

Figure 4A:
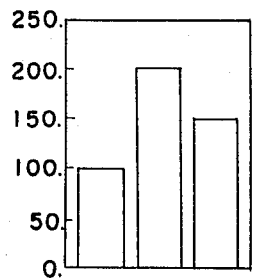
FIGS. 4(a) to 4(d) are diagrams each illustrating the graph format in the same embodiment.

This is a format wherein the graph of a specified type is printed in a single color. It is to be noted that the single color eliminates the need for pen replacement, thus resulting in faster drawing of the graph. The print example in the rod graph is shown in FIG. 4(a).

(2) Hatching Format

Figure 4B:
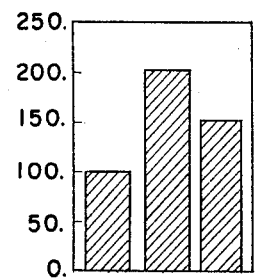

This is a format for displaying with hatching in each region, of the rod graph, the circular graph or the band graph. The print example in the case of the rod graph is shown in FIG. 4(b).

(3) Multicolor Hatching Format

Figure 4C:
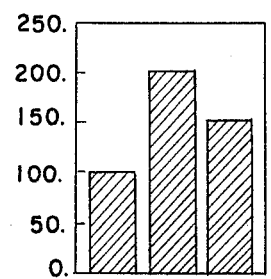

This is a format for displaying, with hatching in each region of the rod, circular, and/or band graphs, with a plurality of colors. The print example in the case of the rod graph is shown in FIG. 4(c), wherein, in the print output, the graph frame and scales are black, the rod graph itself (including the hatching) is red. Also, the print example in the case of the line graph is shown in FIG. 4(d), wherein, in the print output, the graph frame, scales and scale lines L are black, the line graph a is green and the line graph b is red.

(4) Overlap Format

Figure 4D:
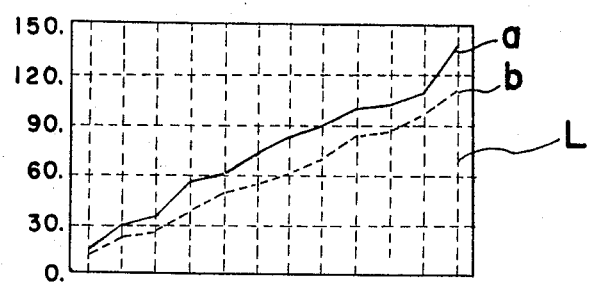

This is a format wherein a plurality of system data are described in graph in one frame, as shown within FIG. 4(d).

(5) Continuous Format

This is a format wherein the printing operation is effected adjacent to the graph of the data in the continuous relation after a certain graph has been printed.

(6) Scale-Mark Printing Format

This is a format wherein a scale-mark L is provided in the rod graph and the line graph, as shown in FIG. 4(d).

As described hereinabove, a graph type is selected by the operation of a slide switch 4, and furthermore a format suitable for the graph type selectively specified is automatically set. The display unit 3 is adapted to display which format is set. Namely, six segments $6_1, \ldots, 6_6$ provided in the display unit 3 are segments for displaying the formats, for instance, $6_1$: segment for displaying the quick format, $6_2$: segment for displaying the hatching format, $6_3$: segment for displaying the multicolor hatching format, $6_4$: segment for displaying the overlap format $6_5$: segment for displaying the continuous format, $6_6$: segment for displaying the scale-mark printing format. These segments are lit to display the set format in the display unit 3. For example, when the quick format is set, the segment $6_1$ for displaying the quick format is lit to display the quick format. Also, when the hatching format is set, the segment $6_2$ for displaying the hatching format is lit to display the hatching mode.

Six keys, 5, which are provided in a corresponding relation of 1 to 1 to the segment 6 for displaying each format, are format keys for changing the format, the key QU is a quick format setting key, HAT a hatching-format setting key, MUL is multicolor-hatching-format setting-releasing key, OV an overlap-format setting-releasing key, CON a continuous-format setting-releasing key, and SC a scale-mark-printing-format setting, releasing key. The graph format can thereby be changed by the action of one of such keys, 5. When the format is set (or released) by the action of the format key, the corresponding format displaying segment is lit (or not lit) in the display unit 3. Accordingly, the operator can make a format change and confirm the change by observing the display.

Figure 2:
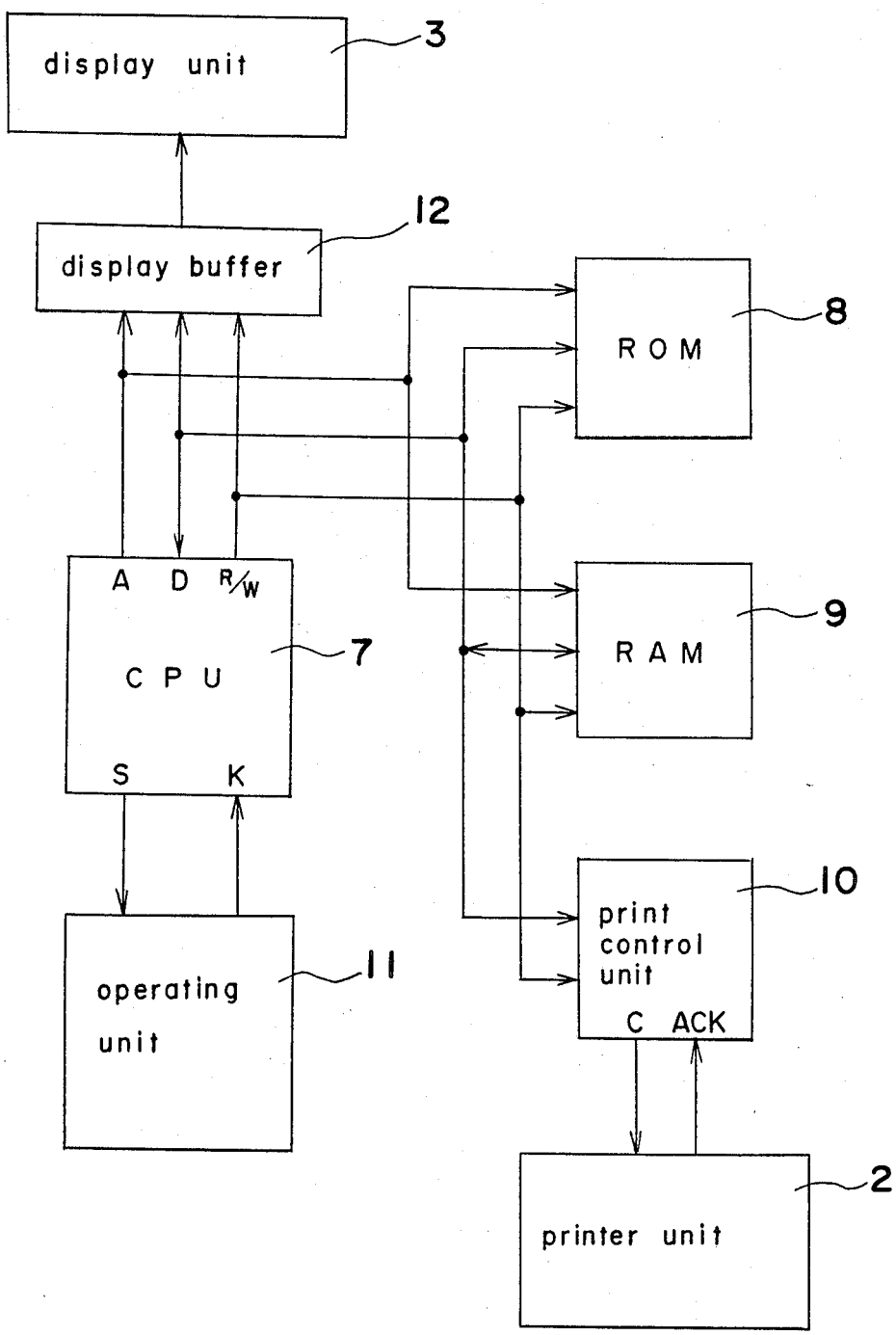
FIG. 2 is a block diagram showing the schematic construction of the same embodiment of FIG. 1.

As described hereinabove, the operator can know, by the format display, a format automatically set during the selective specification of the graph type by the slide switch 4, and can change the format by a format key, confirming the change on the format display. Referring to FIG. 2, there is a block diagram showing the schematic construction of the embodiment of FIG. 1, which comprises a central processing unit (CPU) 7, a read-only memory (ROM) 8, a read/write memory (RAM) 9, a print control unit 10, the printer unit 2, an operating unit 11 including a key input unit 1, a slide switch 4 for selecting the graph type, a format key 5, a display buffer 12, and a display unit 3.

The central processing unit 7 executes various controlling operations by reading the key signals in accordance with the procedure pre-written in the ROM 8, transferring the contents of the RAM 9 to the display buffer 12 to display them on the display unit 3, or transferring the contents of the RAM 9 to the print control unit 10 to print them by the printer unit 2.

The ROM 8 stores the procedures of loading, displaying or printing the key signals, and the procedures of effecting calculating operations in accordance with the numeric values or numeric formula written in the RAM 9.

The RAM 9 is composed of regions, such as registers X, Y, Z, . . . , for storing the numeric values, letters or numeric formulas inputted from the keys, the calculation results, the memory regions of the various conditional flags to be used in the processing by the CPU 7, and regions constituting a counter.

The print control unit 10 decodes the production and the control instructions, such as pen rising/lowering instruction, the straight-line motion instruction of the pen, or the like, of the respective particular patterns of the pre-written numerals, letters by the numerals, letters and print control instructions transferred from the CPU 7 thereby to cause the printer unit 2 to cause the printing operation of the numeral, letter patterns and the pen rising, lowering, the straight-line motion of the pen to the executed.

The operating unit 11 is composed of register keys, alphabet keys, graph print keys for causing the graph printing operations to be executed, slide switches for selecting a graph type, etc. The operating unit 11 decides which key is depressed from a strobe signal S to be outputted from the CPU and a common signal K to be inputted to the CPU 7.

The display buffer 12 converts the numeral or letter data to be transferred from the CPU 7 into display signals adapted for the display unit 3 and outputs them to display various numerals or letters on the display unit 3. The operation thereof will be described hereinafter.

Figure 3A:
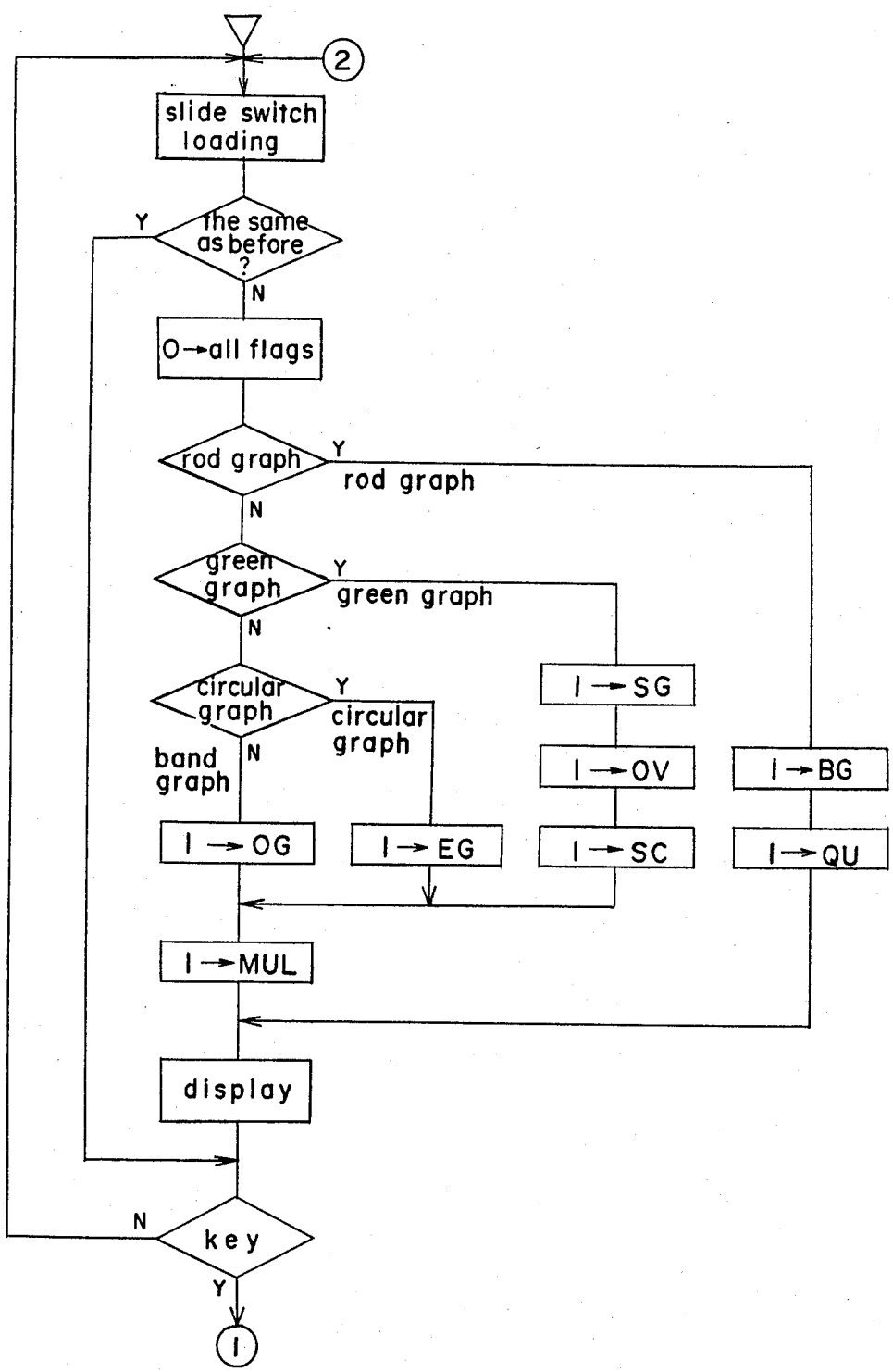
FIGS. 3(a) and 3(b) taken together show a flow chart for illustrating the operations of the same embodiment.
Figure 3B:
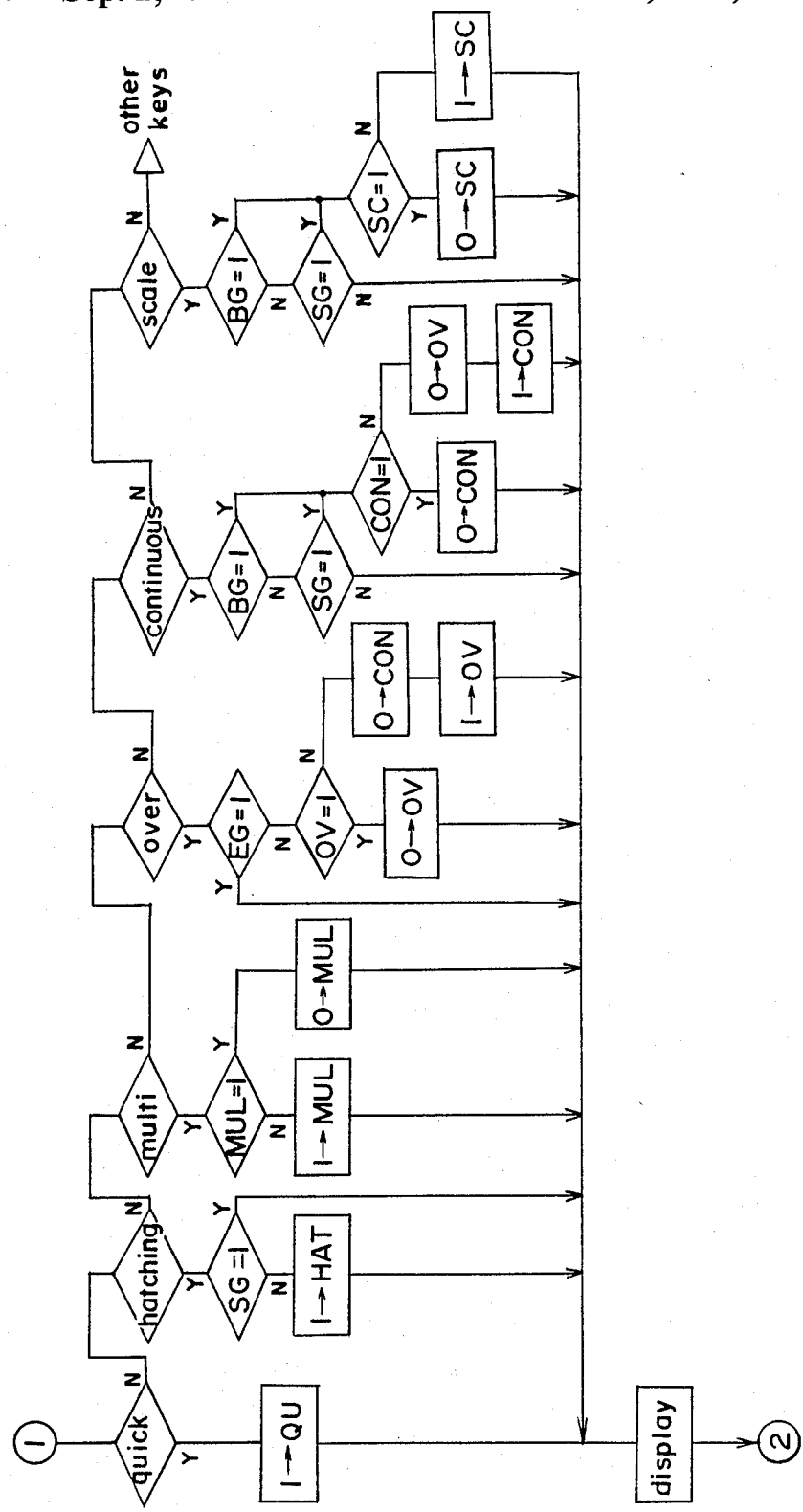

FIG. 3 is a flow chart showing only the procedures, of the present embodiment of FIG. 1, extracted from among the procedures stored in the ROM 8.

Initially the condition of the slide switch 4 is loaded to judge whether or not the condition is the same as that of the previous loading. When the condition is different from that of the previous loading, all the flags, such as graph type flag and format flag, are reset. Thereafter, the graph type and the format are set in accordance with the slide switching condition.

Then, it is judged whether or not the slide switch is in the rod-graph specified condition. When it is in the rod-graph specified condition, a flag BG for drawing the rod graph and a flag QU showing that the format is the quick format are set. Thereafter, the display routine occurs in such a manner that, as the QU is set, the segment $6_1$ for displaying the quick format is lit to display that the quick format is set.

When the condition is not in the rod-graph specified condition, it is judged whether or not the condition is in the line-graph specified condition. When it is in the line-graph specified condition, a flag SG for drawing the line graph, a flag OV showing the overlap format, a flag SC showing the scale-mark print format, and a flag MUL showing the multicolor hatching format are set. Thereafter, in the display routine, as each of the flags MUL, OV, SC are set, the segment $6_3$ for displaying the multicolor hatching format the segment $6_4$ for displaying the overlap format and the segment $6_6$ for displaying the scale-mark print format are set to display that each of the multicolor hatching format, overlap format, and the scale-mark print format is set.

When the condition is not in the line-graph specified condition, it is judged whether or not the condition is in the circular-graph specified condition. When it is in the circular-graph specified condition, a flag EG for drawing the circular graph, and a flag MUL showing a multicolor hatching format are set. Thereafter, in the display routine, a segment $6_3$ for displaying a multicolor hatching format is lit.

When the condition is not in the circular-graph specified condition, the slide switch is in the band-graph specified condition. Thus, a flag OG for drawing the band graph and a flag MUL showing a multicolor hatching format are set, and then, the display routine occurs.

Format change by the format keys will be described hereinafter.

When the format-key action is detected in the key judge of FIG. 3(a), the format-key judging routine of FIG. 2(a) starts.

Firstly, it is judged whether or not the operation key is a quick-format setting key (hereinafter referred to as "quick key"). When the operation key is the quick key, the quick format is set ($1\rightarrow$QU) and thereafter the display routine occurs.

When the quick key is not depressed, it is judged whether or not the hatching-format setting key (hereinafter referred to as "hatching key") is depressed. When the hatching key is depressed, the flag SG for drawing the line graph is judged. In the case of SG=0, i.e., when any of the graphs except for the line graph are to be drawn, the hatching mode is set, i.e., $1\rightarrow$HAT. The HAT is a graph showing the hatching format. Thereafter, the display routine occurs. As the HAT is set, the segment $6_2$ for displaying the hatching format is lit to display that the hatching format is set. In the case of SG=1, i.e., in the line-graph drawing condition, no operation (hereinafter referred to as "NOP") occurs.

When the hatching key is not depressed, it is judged whether or not the multicolor-hatching-format setting-releasing key (hereinafter referred to as "multi-key") is depressed. When the multi-key is depressed, the condition of the flag MUL is reversed, which shows the multicolor hatching format. Namely, the multicolor hatching format is set or released. Thereafter, the display routine occurs.

When the multi-key is not depressed, it is judged whether or not the overlap-mode setting-releasing key (hereinafter referred to as "over-key") is depressed.

When the over-key is depressed, the flag EG for drawing the circular graph is judged. In the case of EG=0, i.e., when in any graph drawing condition except the circular graph, the condition of the flag OV is reversed, which shows the overlap format. Namely, the overlap format is set or released. In addition, when the overlap format is set, the flag CON is reset, which shows the continuous format. In the case of EG=1, i.e., in the circular-graph drawing condition, the NOP occurs.

When the over-key is not depressed, it is judged whether or not the continuous-format setting-releasing key (hereinafter referred to as "continuous key") is depressed. When the continuous key is depressed, the flag BG for drawing the rod graph is judged. In the case of BG=1, the condition of the flag CON which indicate the continuous format, is reversed. Namely, the continuous format is set or released. In addition, when the continuous format is set, the flag OV is reset, which shows the overlap format. Then, the display routine occurs. When the continuous format is set (in the case of CON=1), the segment $6_5$ for displaying the continuous format is lit. In the judgement of the flag BG for drawing the rod graph, the flag SG for drawing the line graph is judged in the BG=0. In the case of SG=1, the same processing as in the above-described BG=1 is executed. In the case of SG=0, the NOP is provided.

When the continuous key is not depressed, it is judged whether or not the scale-mark print format setting-releasing key (hereinafter referred to as "scale key"). When the scale key is depressed, the flag BG is judged. In the case of BG=1, the condition of the flag SC is reversed, which shows the scale-mark print format. Namely, the scale-mark print format is set or released. Thereafter, the display routine occurs. In the judgement of the flag BG, the flag SG is judged in the BG=0. In the case of SG=1, the same processing as in the BG=1 is executed. In the case of SG=0, the NOP is provided.

As described hereinabove, the present invention provides an extremely useful graph drawing machine, which is capable of easily and quickly setting the graph format.

Although the present invention has been fully described in connection with the preferred embodiment thereof with reference to the accompanying drawings, it is to be noted that various changes and modifications are apparent to those skilled in the art. Such changes and modifications are to be understood as included within the spirit and scope of this invention unless they depart therefrom.

What is claimed is:

1. A system for representing data supplied thereto as a graph representative of said data, comprising:

graph type selection means for selecting a desired one of a plurality of different graph types having different graphic visual representations of data supplied said system;

means, responsive to said data supplied said system, for printing a graph of said data, said means for printing being further responsive to said graph selection means, for drawing said graph of the selected said graph type; and graph format selection means for selecting one of a plurality of different graph formats, each said graph format representing a differing shading and/or coloring of each said graph type, said graph format selection means including, switch means for selecting each said graph format; and a plurality of display indicators, each associated with one of said graph formats and responsive to selection of its associated graph format by said switch means, for indicating said graph format selected by said switch means.

2. The system of claim 1 wherein said graph format selection means further includes a plurality of indicia, each associated with a said display indicator, each said indicia visually representing the visual appearance of the selected said graph format on at least one of said graph types.

3. The system of claim 2 wherein each said indicia represents the visual appearance of the selected said graph format on each of said graph types.

4. The system of claim 1 wherein said switch means includes a plurality of push switches, each associated with a said graph format.

5. The system of claim 4 wherein said graph types include all of a line graph type, a bar graph type and a pie graph type.

6. The system of claim 5, wherein said graph formats include all of a single color format, a single color with shading format, a multicolor format and a multicolor with shading format.

7. The system of claim 5 wherein said graph format selection means includes a slide switch for selecting a desired one of said different graph types.

8. The system of claim 1 wherein said graph type selection means is operatively connected to said graph format selection means for automatically controlling the initial selection of one of said plurality of different graph formats in response to selection of a said graph type thereby;

said switch means of said graph format selection means being usable to change said graph format from said initial selection.

* * * * *